(No Model.)
F. E. R. MALKE.
LID FOR VESSELS.
No. 510,354.  Patented Dec. 5, 1893.
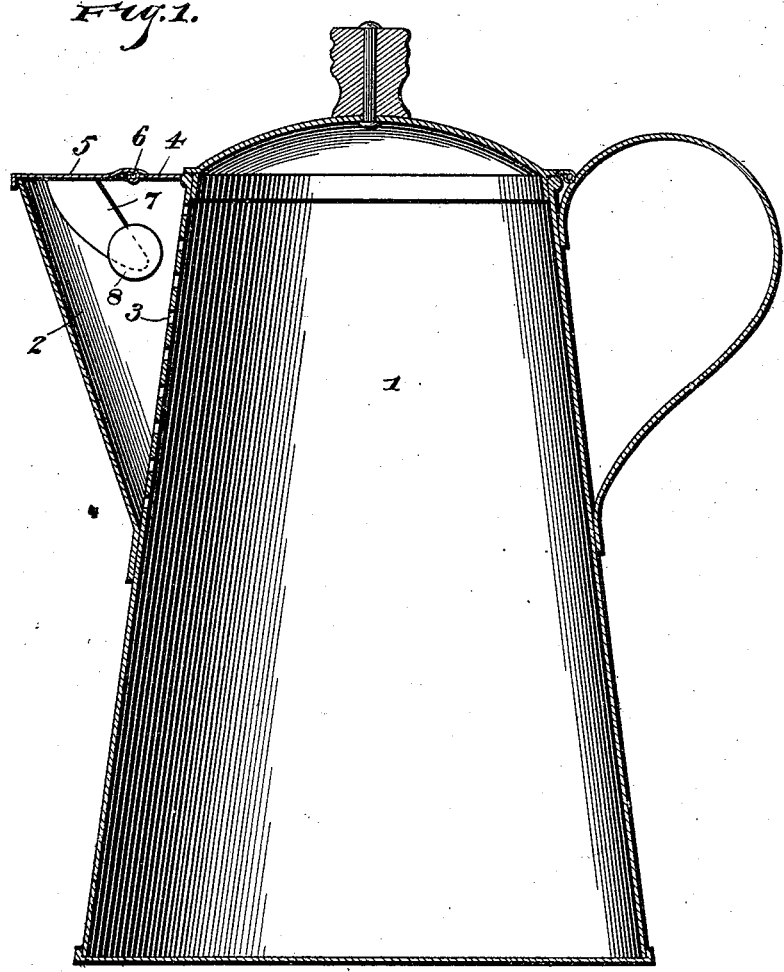
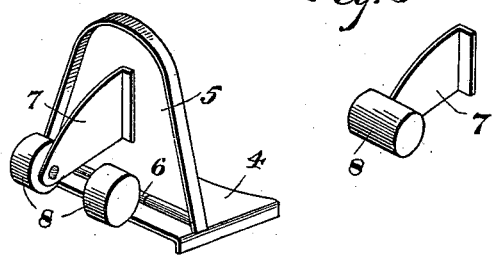
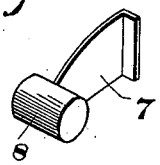
Witnesses
Inventor
Frederick E. R. Malke,
By his Attorneys,
C. A. Snow & Co.

UNITED STATES PATENT OFFICE.

FREDERICK E. R. MALKE, OF CHRISNEY, INDIANA, ASSIGNOR OF ONE-HALF TO GEORGE W. JONES, OF SAME PLACE.

LID FOR VESSELS.

SPECIFICATION forming part of Letters Patent No. 510,354, dated December 5, 1893.

Application filed March 11, 1893. Serial No. 465,592. (No model.)

*To all whom it may concern:*

Be it known that I, FREDERICK E. R. MALKE, a citizen of the United States, residing at Chrisney, in the county of Spencer and State of Indiana, have invented a new and useful Lid for Vessels, of which the following is a specification.

My invention relates to coffee and tea pots and similar vessels, and refers particularly to improvements in self-closing lids for the spouts of vessels which are provided with strainers located between the spout and the body of the vessel. It is the common practice to hinge the lid of the spout upon the upper edge of the shell or body of the vessel, and arrange the strainer also in the plane of the shell of the vessel, but it is desirable, for obvious reasons, to so arrange the parts that the spout lid shall not interfere with the strainer nor be interfered with thereby; and that the spout lid shall begin to rise, or open, as soon as the vessel is tipped slightly to the front. It is therefore the object of my invention to attain these results.

Further objects and advantages of my invention will appear in the following description, and the novel features thereof will be particularly pointed out in the appended claims.

In the drawings: Figure 1 is a vertical central sectional view of a vessel equipped with a spout lid and attachments arranged in accordance with my invention. Fig. 2 is a detail view, in perspective, of the lid and attachments, partly broken away to illustrate the manner of securing the weight to the pendent arm. Fig. 3 is a detail view of the pendent arm and weight.

Similar numerals of reference indicate corresponding parts in the several figures of the drawings.

1 designates the body of a vessel which, in the drawings, is shown in the shape of a coffee pot, 2 the spout of the ordinary form and construction, and 3 the strainer located between the body of the pot and the spout and in the plane of the shell of the former.

The lid of the spout comprises two parts or members; a fixed or permanent member, 4, which covers that portion of the top of the spout which is adjacent to the upper edge of the shell of the pot, and a pivotal or hinged member, 5, which is hinged at its inner edge to the outer edge of the said fixed or permanent member. The outer edge of the fixed or permanent member, 4, is located outside or beyond the vertical plane of any portion of the strainer, 3, and therefore the hinge, 6, by which the outer member, 5, is connected to the fixed or permanent member, is outside or beyond the vertical plane of any portion of the strainer.

Fixed to the under surface of the movable member of the spout lid, (by means of solder or otherwise) is a pendent arm, 7, formed preferably of sheet metal and curved rearwardly toward its lower end. Attached to the free extremity of this pendent arm is a weight, 8, which, when the movable member of the lid is in its normal or closed position, as shown in full lines in Fig. 1, is vertically beneath the hinged edge of said movable member, or in the same vertical plane therewith. That is, the center of gravity of the weight lies in a vertical plane embracing the center of movement of the movable member of the lid.

Inasmuch as the forwardly projecting fixed or permanent member of the lid locates the center of movement of the movable member beyond or in front of the plane of the strainer, as described, it will be seen that the weight hangs freely out of contact with all of the parts of the vessel. Furthermore, it will be observed that while the movable member of the lid is held firmly in its closed position by the pendency of the weight, the slightest forward tipping of the vessel will cause the free or front edge of the movable member to leave the lip of the spout and thus afford an outlet for the contents of the vessel.

The extreme open position of the movable portion of the lid is shown in dotted lines in Fig. 1, by which it will be seen that the same does not fold back sufficiently to throw the weight in rear of the hinged edge of the movable member, and therefore, when released, it will at once resume its closed position.

I am aware that it is common to provide spout lids of vessels with self closing devices, but such devices, heretofore, have been applied, in general, to ice-pitchers, cream and molasses jugs, &c., or to those vessels having no strainers, and thus offering no obstacle to the free movement of the weighted arm.

It is obvious that even without the peculiar construction and combination of elements hereinbefore set forth for preventing contact and interference between the weight and the strainer, such could be accomplished by shortening the pendent arm, but it must be noted in this connection that if the pendent arm is shortened the weight will not normally occupy a position vertically beneath the hinged edge of the lid, and therefore it will close before the vessel reaches an upright position (after having been inclined to discharge a portion of its contents), and will not open until the vessel has reached a considerable pitch. This imperfect operation would be inconvenient in pouring from a vessel which is well filled, for the reason that the contents would pass into the spout and rise therein above its lip before the lid would rise to allow the same to escape, and when the lid finally opened, or was forced open by the pressure of the contents, the latter would be discharged in bulk and thus scattered and spilled. The pendent arm is provided at its extremity with a perforation, 9, and the weight, 8, comprises two portions, $8^a$, arranged upon opposite sides of the arm and connected by a neck, 10, which extends through the said perforations. This weight is preferably molded upon the arm so that the opposite portions are integral, and the advantage in the described construction is that the detachment of the weight by a jar, or in cleaning the vessel, is prevented.

Having thus described my invention, what I claim, and desire to secure by Letters Patent, is—

The combination with a vessel provided with a spout and having a strainer arranged between the body of the vessel and the spout and in the plane of the side of the said body, of a spout lid comprising a stationary horizontal portion, 4, fixed to the upper edge of the spout and extending outwardly from the upper edge of the body of the vessel beyond the plane of the strainer, a movable portion covering the front portion of the spout and hinged to the edge of the stationary portion, and an arm fixed to the under side of the movable portion, midway between its hinged and free edges, curving rearwardly and downwardly and terminating in a weight which, when the movable portion is in its normal or closed position, is located vertically beneath the hinged edge of the movable portion, whereby the lid opens immediately upon the inclination of the vessel and does not close until the vessel has reached its upright position, substantially as specified.

In testimony that I claim the foregoing as my own I have hereto affixed my signature in the presence of two witnesses.

FREDERICK E. R. MALKE.

Witnesses:
JOHN A. JONES,
CHAS. W. FELIX.